FURST, BRADLEY & LACEY.
Horse Rake.
No. 34,953. Patented April 15, 1862.
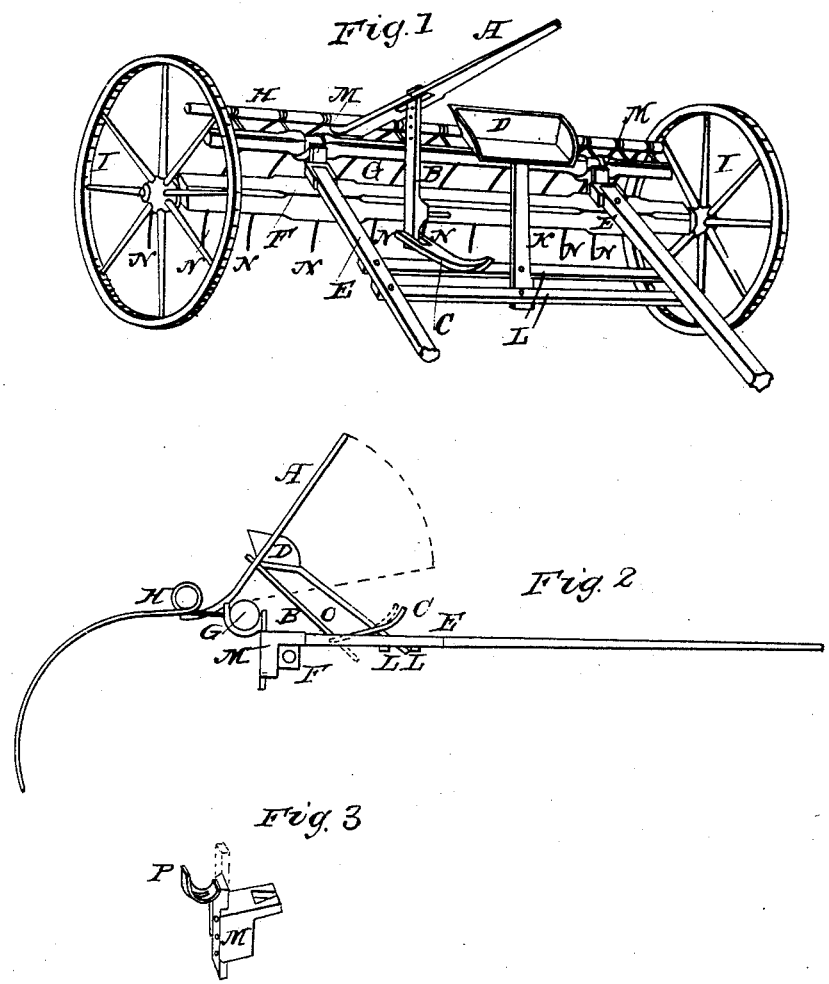

UNITED STATES PATENT OFFICE.

CONRAD FURST, DAVID BRADLEY, AND JOHN LACEY, OF CHICAGO, ILLINOIS.

IMPROVEMENT IN HORSE-RAKES.

Specification forming part of Letters Patent No. 34,953, dated April 15, 1862.

*To all whom it may concern:*

Be it known that we, CONRAD FURST, DAVID BRADLEY, and JOHN LACEY, of the city of Chicago, in the county of Cook and State of Illinois, have invented a new Improvement in Horse-Rakes; and we hereby declare that the following is a clear and exact description thereof, reference being had to the accompanying drawings, and to the letters of reference marked thereon, in which—

Figure 1 is a perspective view. Fig. 2 is a side and sectional view. Fig. 3 is sectional part of the same.

The object of this invention is to obtain a horse-rake that, first, shall be cheap and simple in its construction; and, secondly, one that will be attended with but little labor in its operation, as but little strength is requisite to manage it in all kinds of work. The purpose of the said rake is to gather or rake into windrows or gavels hay or grain, and is also adapted to glean wheat or other small grain from stubble-ground, as will be hereinafter described.

To enable others skilled in the art to make and use our invention, we will proceed to describe its construction and operation.

The rake-head H G, axle F, seat D and K, shafts E E, cross-bars L L, and wheels I are made of suitable lengths and sizes, which, being put properly together, as seen in Fig. 1, constitutes our rake-head and carriage frame-work. Attached to the axle F is a dovetailed-formed socket, M, which is made in such a manner as to receive the shafts E E, and is also supplied with a dovetailed aperture. In this aperture is placed a slide, P, to fit, and is constructed so as to sustain the rake-head and allow it to turn, said slide and socket being shown in Fig. 3. The object of the said slide and socket is to allow the rake-head to be raised and lowered to suit the height of all sized wagon and carriage wheels, and to bring the rake-head a suitable distance from the ground to glean wheat or other small grain stubble fields, thereby avoiding gathering offal or other substances lying near the ground not desirable to be gathered. By the use of the said slide and socket referred to it will be seen that it is not necessary for the buyer to purchase wheels with this rake, as ordinary carriage or wagon wheels may be used, as the said slide and socket M and P may be adjusted to fit all sized wheels, thereby lessening very much its cost. Lever A in Fig. 1 is attached to the rake-head H and G. Lever B is attached at a suitable distance from the end of lever A, and is supplied with a pin, O, and connected with the double-acting treadle C, and it will be seen that pressing lever A causes the rake-head to raise and dislodge its load; or it may be held in a proper position and cause the teeth N N to press firmly on the ground. The same effect is produced by placing the foot on the pin O and pressing down, and by pressing the treadle C causes the teeth to bear firmly on the ground. It may be worked by either hand or foot, being optional with the operator, and is so easily adjusted that a boy can work it either way.

Having thus described the construction and operation of our invention, we claim—

The slide and socket M and P, arranged in combination with the rake-head and axle, in the manner and for the purpose specified.

CONRAD FURST.
    DAVID BRADLEY.
    JOHN LACEY.

Witnesses:
 J. D. WARD,
 A. D. STURTEVANT.